(12) United States Patent  (10) Patent No.: US 8,328,578 B2
Csak                      (45) Date of Patent:     Dec. 11, 2012

(54) ELECTRICAL CONNECTOR AND A METHOD FOR MANUFACTURING SAME

(75) Inventor: Louis R. Csak, Old Greenwich, CT (US)

(73) Assignee: Lex Products Corp, Shelton, CT (US)

( * ) Notice: Subject to any disclaimer, the term of this patent is extended or adjusted under 35 U.S.C. 154(b) by 0 days.

(21) Appl. No.: 12/856,220

(22) Filed: Aug. 13, 2010

(65) Prior Publication Data

US 2012/0040564 A1    Feb. 16, 2012

(51) Int. Cl.
*H01R 13/58* (2006.01)
(52) U.S. Cl. .......................................... 439/606
(58) Field of Classification Search .................. 29/856, 29/858, 883; 439/604, 606
See application file for complete search history.

(56) References Cited

U.S. PATENT DOCUMENTS

| | | |
|---|---|---|
| 2,544,430 A | 3/1951 | McCutchan |
| 2,949,642 A | 8/1960 | Lieberman |
| 3,784,729 A | 1/1974 | Davis et al. |
| 4,025,600 A | 5/1977 | Parr |
| 4,090,294 A | 5/1978 | Parr |
| 4,495,130 A | 1/1985 | Hedrick |
| 5,470,238 A | 11/1995 | Walden |
| 6,131,270 A | 10/2000 | Van Den Berg |
| 6,679,730 B2 | 1/2004 | Dye et al. |
| 6,695,641 B1 | 2/2004 | Lee |
| 6,793,530 B2 | 9/2004 | Walse |
| 7,201,595 B1 | 4/2007 | Morello |
| 2003/0129875 A1 | 7/2003 | Ho |
| 2006/0246779 A1 | 11/2006 | Helbok et al. |
| 2009/0004916 A1 | 1/2009 | Miyoshi et al. |
| 2009/0042435 A1 | 2/2009 | Ute et al. |
| 2009/0186506 A1* | 7/2009 | Chen et al. ................. 439/281 |

* cited by examiner

*Primary Examiner* — Ross Gushi
(74) *Attorney, Agent, or Firm* — Steven M. McHugh

(57) ABSTRACT

An electrical connector assembly is provided and includes a plurality of cables, each of which have a conductor, and an electrical connector having a connector housing which houses a plurality of pins/sockets, each of which are connected to a pin/socket termination, wherein each pin/socket termination is connected to a conductor of the cables. The connector further includes a thermoplastic pre-mold covering which securely covers a portion of the connector housing, the pin/socket terminations and a portion of the plurality of cables, wherein the pre-mold covering is securely attached to the portion of the connector housing, the pin/socket terminations and the portion of the plurality of cables via a pre-mold process which incorporates a mold having a control finger configured to position the cables away from the wall of the mold cavity and flow channels for injecting plastic on both sides of the control finger during the molding process.

20 Claims, 14 Drawing Sheets

ELECTRICAL CONNECTOR AND A METHOD FOR MANUFACTURING SAME

FIELD OF THE INVENTION

The present invention relates to molded electrical connectors and more particularly to an improved mold and method for making a molded electrical connector where the connector has an electrically insulating material which covers and seals around and between the cable(s)/conductors of the connector.

BACKGROUND OF THE INVENTION

Molded electrical connector assemblies which include a multi-pin connector connected to the end of a multi-cable assembly and which is configured to connect with electrical equipment or the end of another multi-cable connector assembly are well known in the art. These connectors assemblies, which may have male-type electrical pin connectors to connect with a female-type socket interface (and/or female-type sockets to receive a male-type electrical pin interface), are typically used for electrical supply lines or to connect a device to a control bus or central power supply and are used extensively in various applications across several different industries, such as the automotive industry for rechargeable electrical vehicles and the entertainment industry for distributing power to instruments, lighting fixtures and other equipment. These types of cable/connector assemblies are preferred for the foregoing tasks as they are safe, somewhat durable, reliable, and maintenance free.

Referring to FIG. 1a, a typical electrical connector assembly 100 includes a plurality of cables 102 (which may be partially covered in a protective rubber material 103) and a multi-pin connector 104 having a connector housing 106 which includes a plurality of pins 108 (or sockets 109 as shown in FIG. 1b) that are accessible from a front side 110 of the connector housing 106, where each of the pins 108 is mechanically (and electrically) connected to one or more of a plurality of pin (or socket) terminations 112 that are accessible from the rear side 114 of the connector housing 106. Each of the conductors of the plurality of cables 102 is mechanically (and electrically) connected to one or more of the plurality of pin terminations 112. The electrical connector assembly 100 is then disposed in a mold where the electrical connector assembly 100 is covered by an insulating and protective material as discussed further hereinafter.

Currently, traditional methods for molding the electrical connector assembly 100 involve two separate molding processes. First, the cable/connector combination is disposed in a mold where a pre-mold process is applied. This pre-mold process encapsulates the contacts and wires with a polypropylene material to provide an environment seal of the terminations and to provide for a mechanical (and electrical) bond between the cables and connector. Second, the cables protruding from the polypropylene pre-mold are then wrapped in tape and the assembly goes through an over-mold process which covers the taped portion of the cables and the pre-mold with a thermoplastic elastomer (TPE) material, such as a synthetic rubber/polypropylene combination. This pre-mold and over-mold material provides some strain relief and impact resistance to help protect the internal conductors of the assembly.

Unfortunately however, this traditional method is labor intensive and because the thermoplastic typically doesn't completely surround and encapsulate the cables, the pre-molded assembly still allows for unwanted movement of the cables during use. This causes an increase in the strain on the cables and wiring terminations and decreases the lifespan and reliability of the electrical connector assembly. Thus, it is desirable to make an improved version of the foregoing kinds of connectors, where the connectors are more attractive and smaller in profile, while at the same time providing a stronger connector assembly having a greater life expectancy and reliability than current connectors.

SUMMARY OF THE INVENTION

One embodiment of the present invention includes and improved mold for pre-molding an electrical connector assembly, where the electrical connector assembly includes an electrical connector having a connector termination and at least one cable having a conductor that is electrically associated with the connector termination. The improved mold includes a first pre-mold plate having a first cutout that defines a cable portion cavity and a connector-termination portion cavity. The cable portion cavity may be configured to contain at least a portion of the at least one cable and the connector-termination portion cavity may be configured to contain at least a portion of the connector termination. The improved mold also includes a second pre-mold plate having a second cutout that also defines a cable portion cavity and a connector-termination portion cavity. As with the first pre-mold plate, the cable portion cavity of the second pre-mold plate is configured to contain at least a portion of the at least one cable and the connector-termination portion cavity of the second pre-mold plate is configured to contain at least a portion of the connector termination. It should be appreciated that the first pre-mold plate and second pre-mold plate are configured to securely connect together to form the complete mold, wherein each of the first pre-mold plate and second pre-mold plate include at least one control finger, located within the cable portion cavity, configured to position the at least one cable away from the wall of the first and second cutout when connected together.

An additional embodiment of the present invention includes a method for molding an improved electrical connector assembly using the pre-mold mold described herein, where the pre-mold mold includes control fingers to position cables of the connector assembly during the molding process. The improved electrical connector assembly includes an electrical connector having a plurality of pins/sockets, each of which are electrically connected to one (or more) of a plurality of pin/socket terminations (also on the connector) and a plurality of cables each having a conductor. The method includes connecting each of the conductors to at least one of the pin/socket terminations to form an unmolded connector assembly such that any electricity flowing through the conductors will also flow through the connected pin/socket terminations. The method also includes associating the unmolded connector assembly with the pre-mold mold such that the control fingers position the plurality of cables toward the center of the mold cavity to allow thermoplastic to flow around and between the plurality of cables during the molding process. Thermoplastic is then injected into the pre-mold mold to create an improved pre-molded electrical connector assembly, wherein a portion of the cables and the pin/socket terminations are covered by thermoplastic.

Still yet another embodiment includes an electrical connector assembly having a plurality of cables, each of which have a conductor, and an electrical connector having a connector housing which houses a plurality of pins/sockets, each of which are connected to a pin/socket termination, wherein each pin/socket termination is connected to a conductor of the plurality of cables. The connector further includes a thermoplastic pre-mold covering which securely covers a portion of the connector housing, the pin/socket terminations and a portion of the plurality of cables, wherein the pre-mold covering is securely attached to the portion of the connector housing, the pin/socket terminations and the portion of the plurality of cables via a pre-mold process which incorporates a mold that includes at least one control finger, located within a mold cavity, configured to position the plurality of cables away from the wall of the mold cavity during the molding process

BRIEF DESCRIPTION OF THE DRAWINGS

FIG. 1b is an isometric view showing an assembled unmolded electrical connector assembly of FIG. 1a.

DETAILED DESCRIPTION OF THE INVENTION

It should be appreciated that for simplicity the term cable is used herein to refer to optical fibers, single conductors (wires) and/or cable assemblies having multiple conductors or optical fibers. Accordingly, the mold, method and electrical connector assembly disclosed herein in accordance with the invention may include 1) single and/or multiple wire conductor(s), 2) single or multiple optical fiber(s), 3) multiple cable assembly(s), where each assembly may be constructed from single and/or multiple conductors and/or optical fibers, and/or 4) any combination of the above.

Figure 1A:
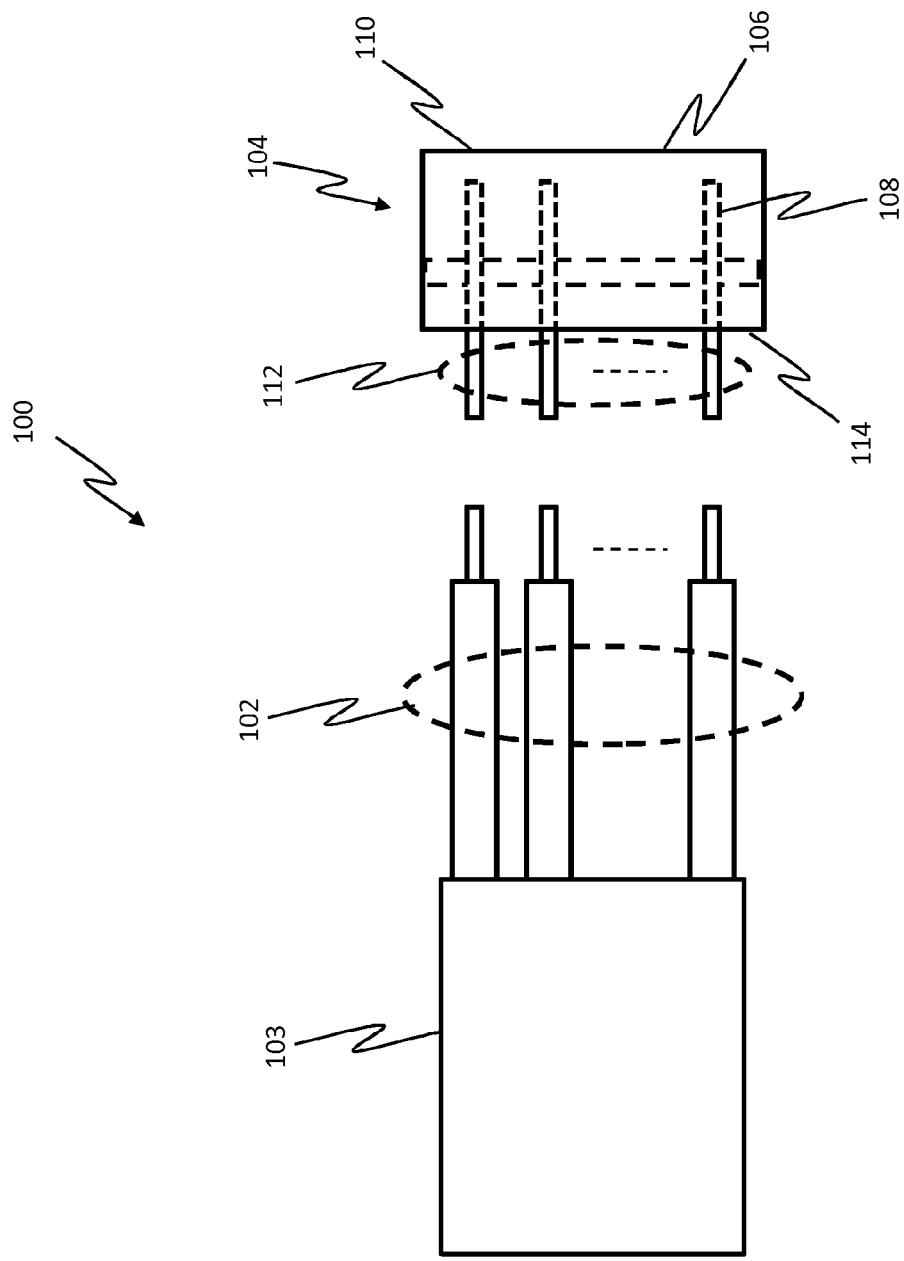
FIG. 1a is a side view showing a disassembled unmolded electrical connector assembly having an electrical connector and a plurality of cables with conductors.
Figure 1B:
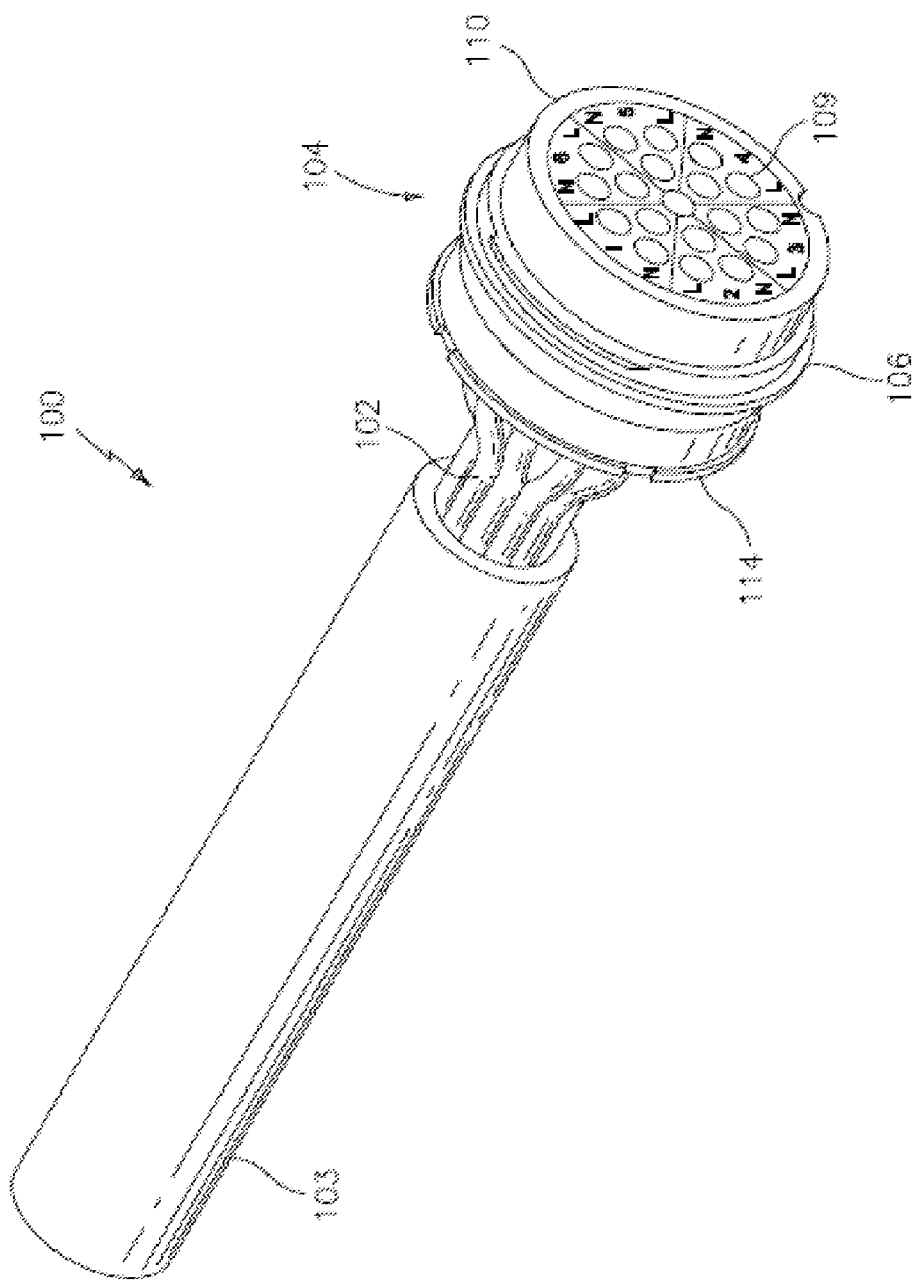
Figure 2:
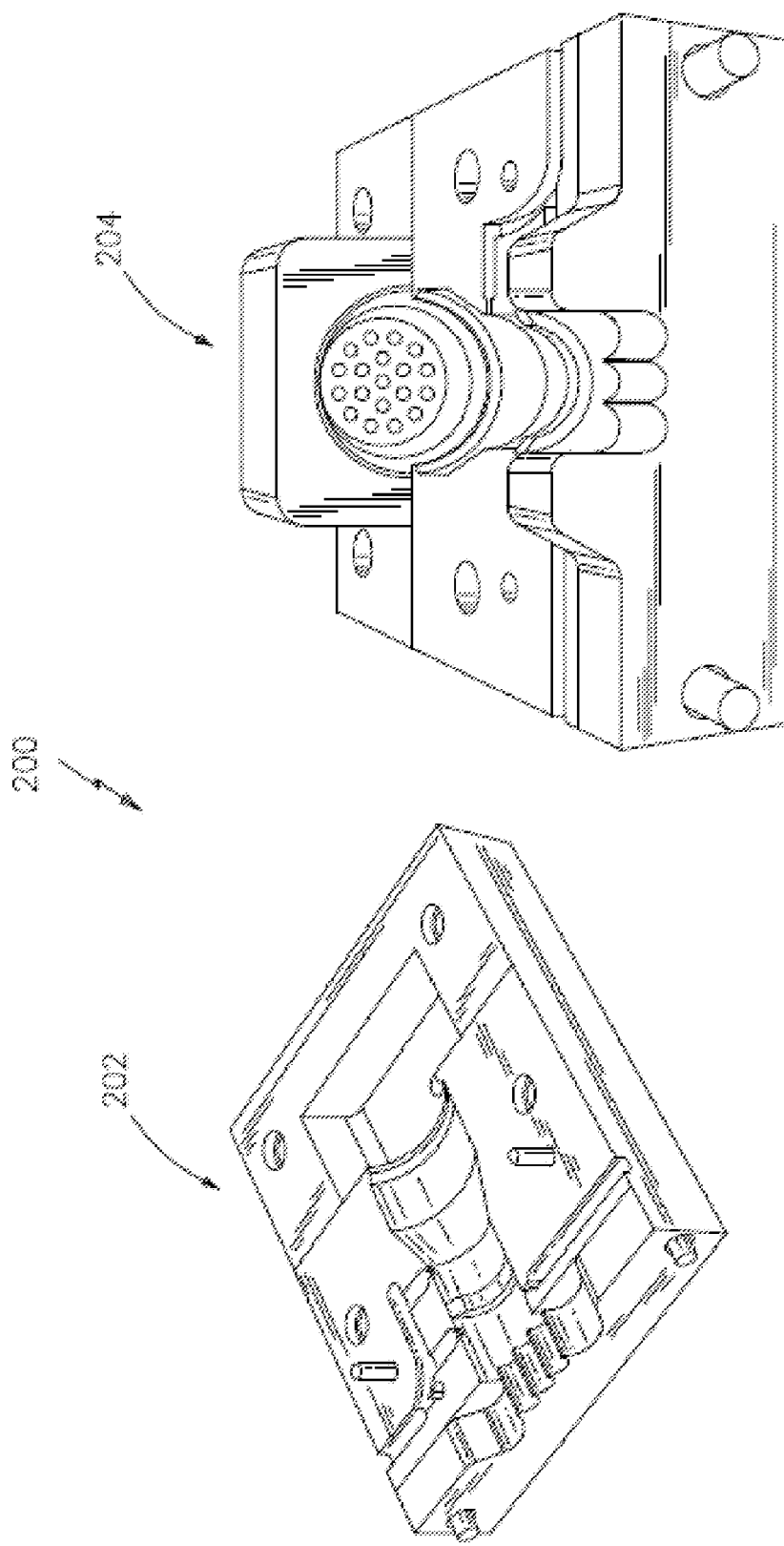
FIG. 2 is an isometric view showing the first and second pre-mold plates of an improved pre-mold mold for molding an electrical connector assembly, in accordance with the present invention.

In accordance with the present invention, as discussed hereinafter an improved pre-mold mold and a method for molding an improved electrical connector assembly is provided where the mold includes control fingers having a chamfered portion to prevent/eliminate pinching of the cables of the assembly and where the control fingers are configured to position the cables of the assembly into a desired arrangement that allows thermoplastic to completely fill the mold (around and between the cables) during the molding process. Referring to FIG. 2, an isometric view of an improved pre-mold mold 200 is shown in accordance with the invention and includes a first pre-mold plate 202 and a second pre-mold plate 204.

Figure 3:
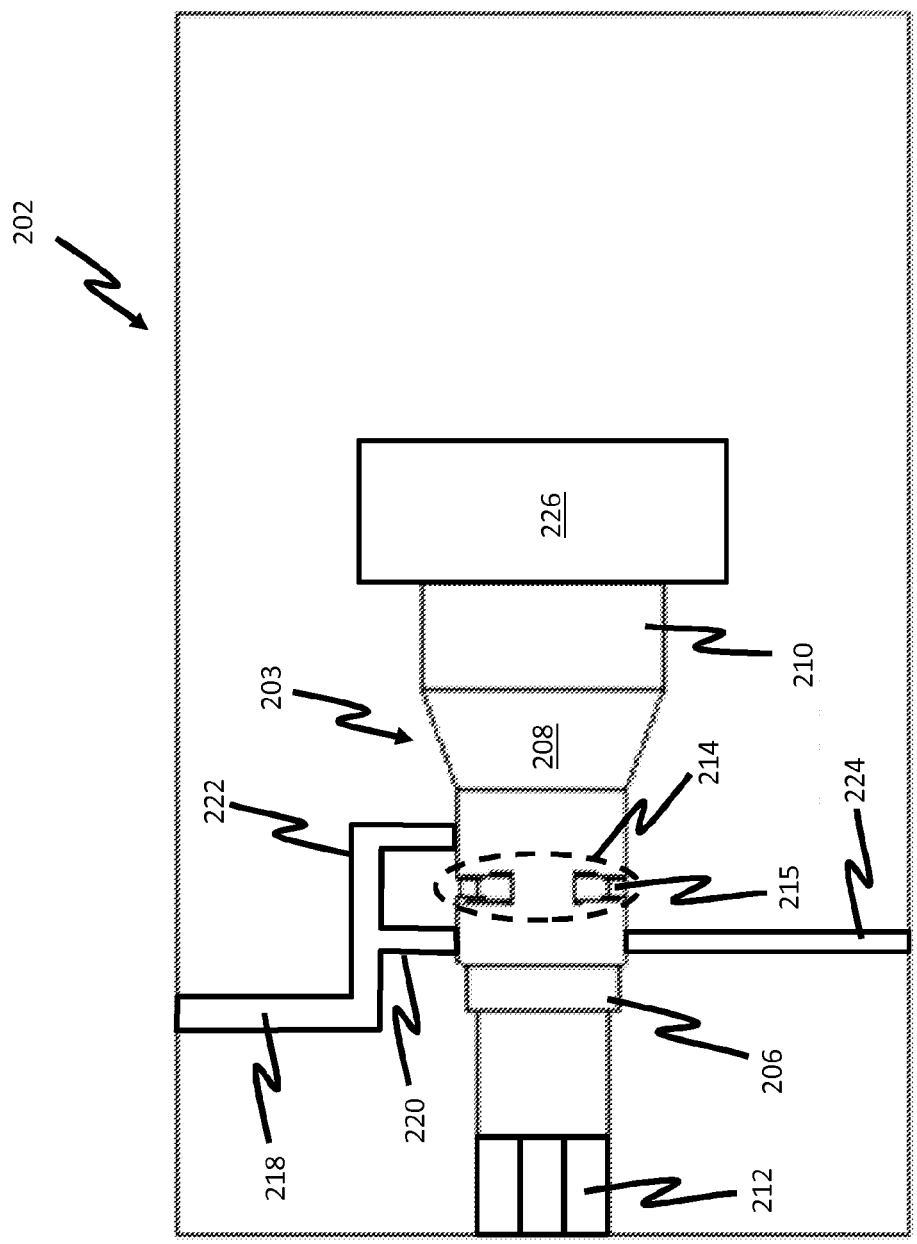
FIG. 3 is a top down view of the first pre-mold plate of the improved pre-mold mold of FIG. 2.

Referring to FIG. 3, a top down view of the first pre-mold plate 202 is shown where the first pre-mold plate 202 includes a first plate cutout 203 which defines a first plate cavity 206 for partially containing the cables 102 and a portion of the connector housing 106 during the pre-mold process. The first plate cavity 206 includes a cable portion cavity 208 and a connector-termination portion cavity 210, where during the pre-mold process the cable portion cavity 208 contains the cables 102 and the connector-termination portion cavity 210 contains the connector pin (or socket) terminations 112 that are connected to the cable conductors. As shown, cable guides 212 are included at the input to the cable portion cavity 208 to position the cables 102 during the pre-molding process. Control fingers 214 having a chamfered portion 215 are included near the center of the cable portion cavity 208 and are located on the wall of the cutout 203. The control fingers 214 are located to reposition the cables 102 away from the wall of the cutout 203 and more toward the center of the cable portion cavity 208 and the chamfered portion 215 is configured to minimize/eliminate pinching of the cables 102 when the first pre-mold plate 202 and the second pre-mold plate 204 are connected together. As discussed in further detail hereinafter, the chamfer positions the cables to allow the flowing molten plastic to completely envelope the cables, as well as flow between the cables.

Also included in the first pre-mold plate 202 is a flow channel or molten plastic runner 218 for injecting molten plastic into the cavity of the mold 200. As shown, the molten plastic runner 218 is divided into a first flow channel or first gate 220 and a second flow channel or second gate 222, where the first gate 220 directs the molten plastic flow into the cavity of the mold 200 on one side of the control fingers 214 and the second gate 222 directs the molten plastic flow into the cavity of the mold 200 on the other side of the control fingers 214. Also included in the first pre-mold plate 202 is a vent channel 224 for allowing air to escape from the cavity of the mold 200 during the molding process as well as a connector holder cavity 226 for containing a connector holder portion located on the second pre-mold plate 204.

Figure 4:
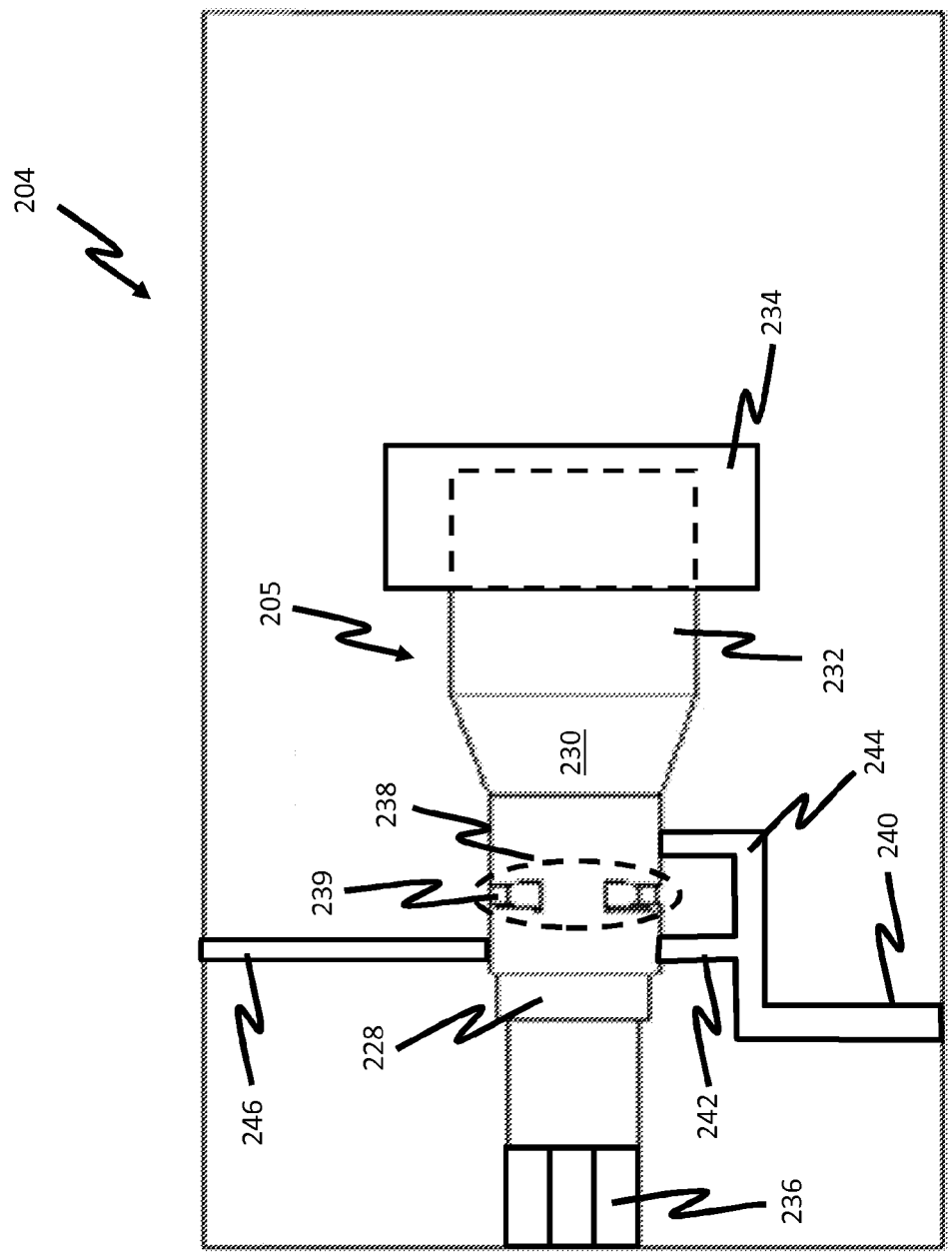
FIG. 4 is a top down view of the second pre-mold plate of the improved pre-mold mold of FIG. 2.

Referring to FIG. 4, a top down view of the second pre-mold plate 204 is shown where the second pre-mold plate 204 includes a second plate cutout 205 which defines a second plate cavity 228 for partially containing the cables 102 and a portion of the connector housing 106 during the pre-mold process. The second plate cavity 228 also includes a cable portion cavity 230 and a connector-termination portion cavity 232, where the cable portion cavity 230 contains the cables 102 and the connector-termination portion cavity 232 contains the connector pin (or socket) terminations 112 that are connected to the cable conductors. The second pre-mold plate 204 also includes a connector holder portion 234 for holding the connector housing 106 during the pre-mold process. As such, when the connector housing 106 is disposed in the connector holder portion 234, the connector pin (or socket)

terminations 112 that are connected to the cable conductors are located in the connector-termination portion cavity 232. The second pre-mold plate 204 also includes cable guides 236 at the input to the cable portion cavity 230 to position the cables 102 during the pre-molding process. Control fingers 238 having a chamfered portion 239 are also included near the center of the cable portion cavity 230 and are located on the wall of the cutout 205. The control fingers 238 are located to reposition the cables 102 away from the wall of the cutout 205 and more toward the center of the cable portion cavity 230 and the chamfered portion 239 is configured to minimize/eliminate pinching of the cables 102 when the first pre-mold plate 202 and the second pre-mold plate 204 are connected together.

Also included in the second pre-mold plate 204 is a flow channel or molten plastic runner 240 in flow communication with the cavity of the mold 200 for injecting molten plastic into the cavity of the mold 200. As shown, the molten plastic runner 240 is divided into a first flow channel or first gate 242 and a second flow channel or second gate 244, where the first gate 242 directs the molten plastic flow into the cavity of the mold 200 on one side of the control fingers 238 and the second gate 244 directs the molten plastic flow into the cavity of the mold 200 on the other side of the control fingers 238. Also included in the second pre-mold plate 204 is a vent channel 246 for allowing air to escape from the cavity of the mold 200 during the molding process.

It should be appreciated that that first pre-mold 202 and the second pre-mold 204 are configured to securely connect together and to align together to form the complete mold 200. As such, when connected together, the first plate cavity 206 and the second plate cavity 228 are aligned to form one internal mold cavity. Accordingly, the control fingers 214, 238 are aligned to reposition the cables 102 away from the wall of the cutouts 203, 205 and more toward the center of the cable portion cavities 208, 230, the molten plastic runners 218, 240 are aligned to form complete flow channels, the vent channels 224, 246 are aligned to form complete vent channels and the connector holder cavity 226 is aligned to contain the connector holder portion 234.

Figure 5A:
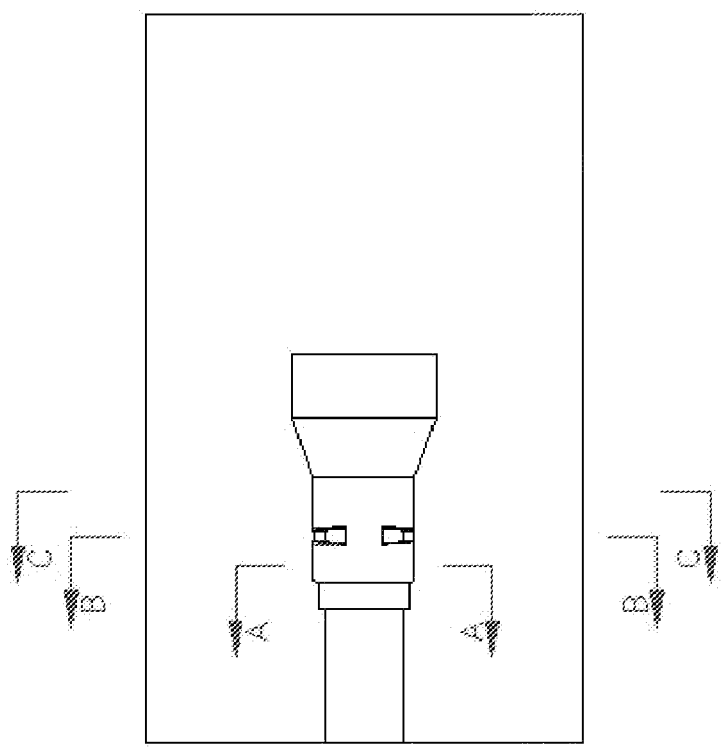
FIG. 5a is a top down view of a pre-mold plate of the mold of FIG. 2.
Figure 5B:
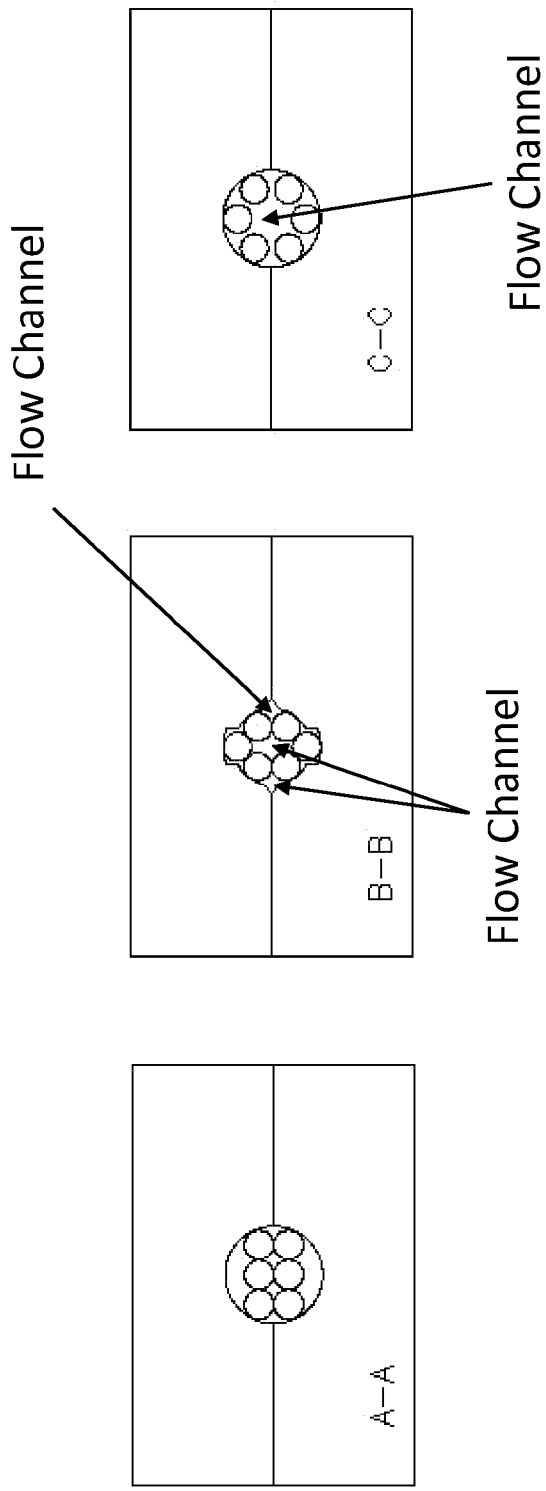
FIG. 5b is a cross sectional view of the pre-mold plate of FIG. 5a showing cross sections of the complete mold with cables taken at various sectionals of the pre-mold plate.
Figure 6:
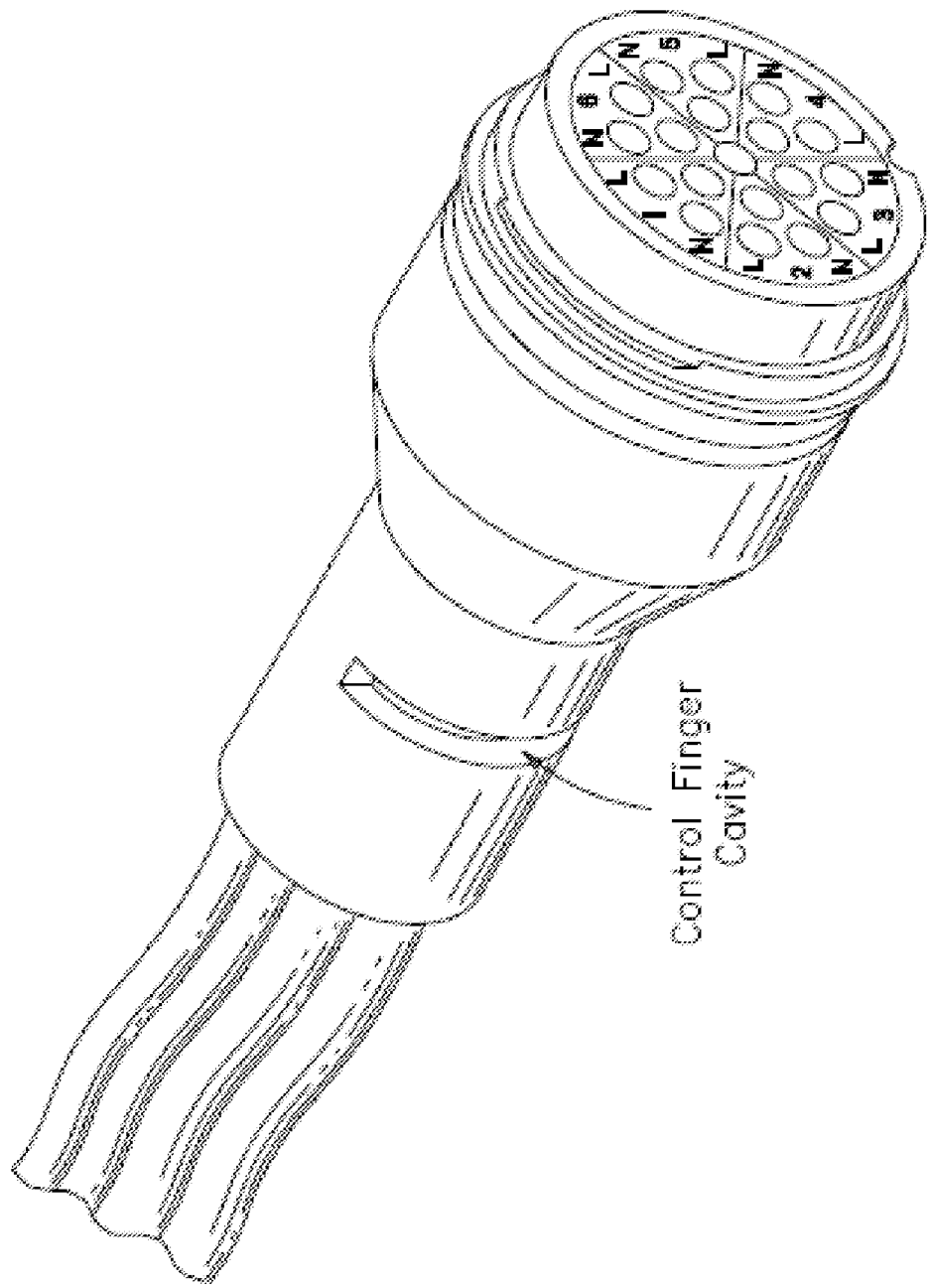
FIG. 6 is perspective view of the electrical connector assembly of FIG. 1b following the pre-molding process using the pre-mold mold of FIG. 2.

It should be appreciated that when molded using the improved pre-mold mold 200, the improved electrical connector assembly is superior to currently existing electrical connectors because the control fingers 214, 238 allow thermoplastic to flow between and around the cables 102 to completely and securely encapsulate the cables 102 and the connector pin (or socket) terminations 112. This can be seen by referring to FIG. 5a and FIG. 5b, where it is apparent that the position and configuration of the cables 102 are different at different points within the mold cutout 203, 205. As can be seen, sectional view B-B illustrates the configuration and position of the cables 102 in the area of the control fingers 214, 238, where the control fingers 214, 238 position and configure the cables 102 such that flow channels are created to allow the flowing molten plastic to completely envelope and capture the cables 102, as well as flow between the cables 102. Also, sectional view C-C illustrates the configuration and position of the cables 102 in the area of the cable terminations located after the control fingers 214, 238, where the cables 102 are positioned more evenly to let the molten plastic flow between the cables. This positioning and configuring of the cables 102 advantageously provides for a more stable and secure pre-mold structure for holding the cables 102. An electrical connector molded using the improved mold and method of the present invention is shown in FIG. 6 and clearly illustrates how the plastic pre-mold has properly captured the cables 102. As there is no plastic flowing in the location of the control fingers 214, 238, a control finger cavity is created in the pre-mold structure, as shown in FIG. 6.

Figure 7:
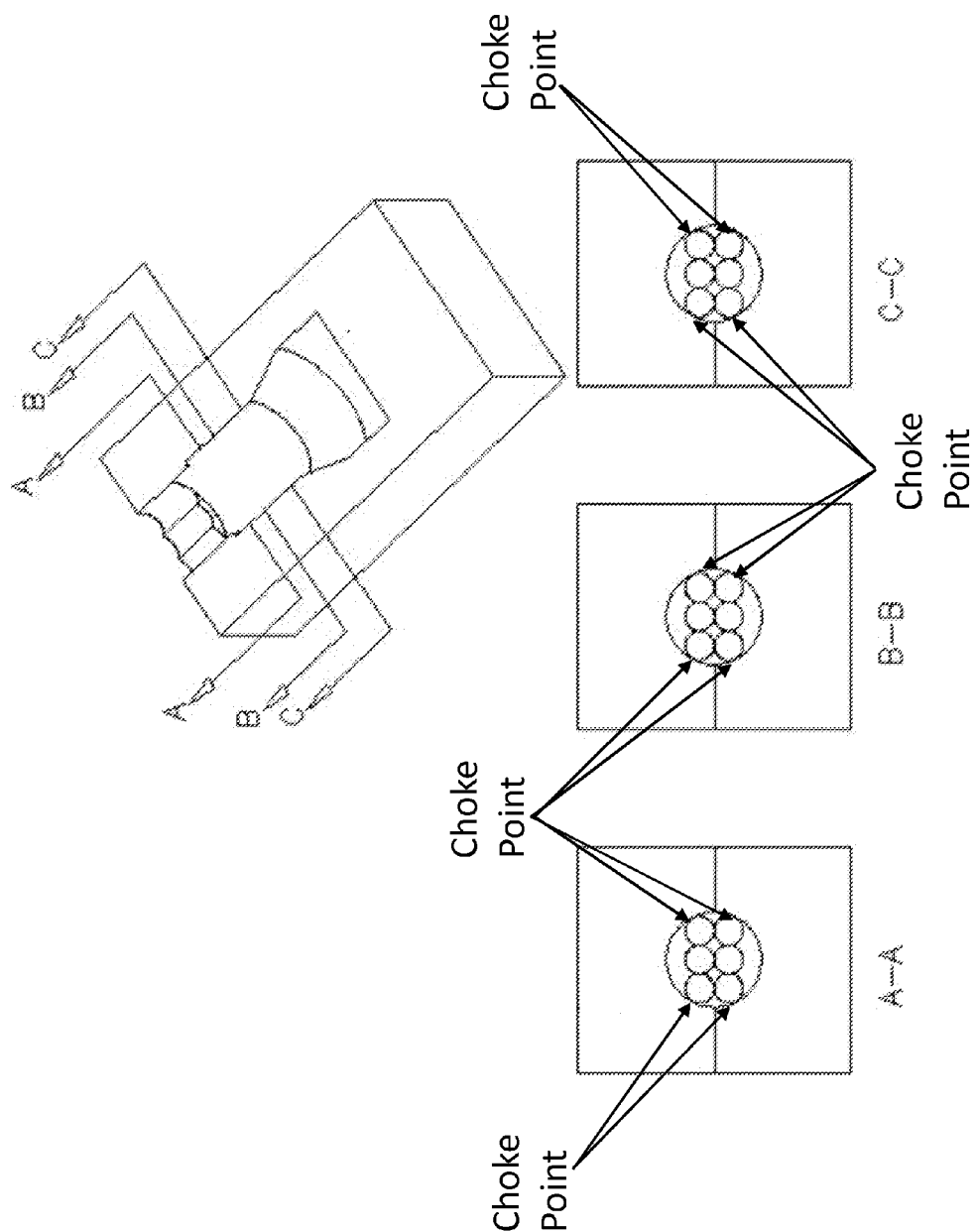
FIG. 7 is a top down and cross sectional view of the pre-mold plate of the prior art showing cross sections of the complete mold with cables taken at various sectionals of the pre-mold plate.
Figure 8:
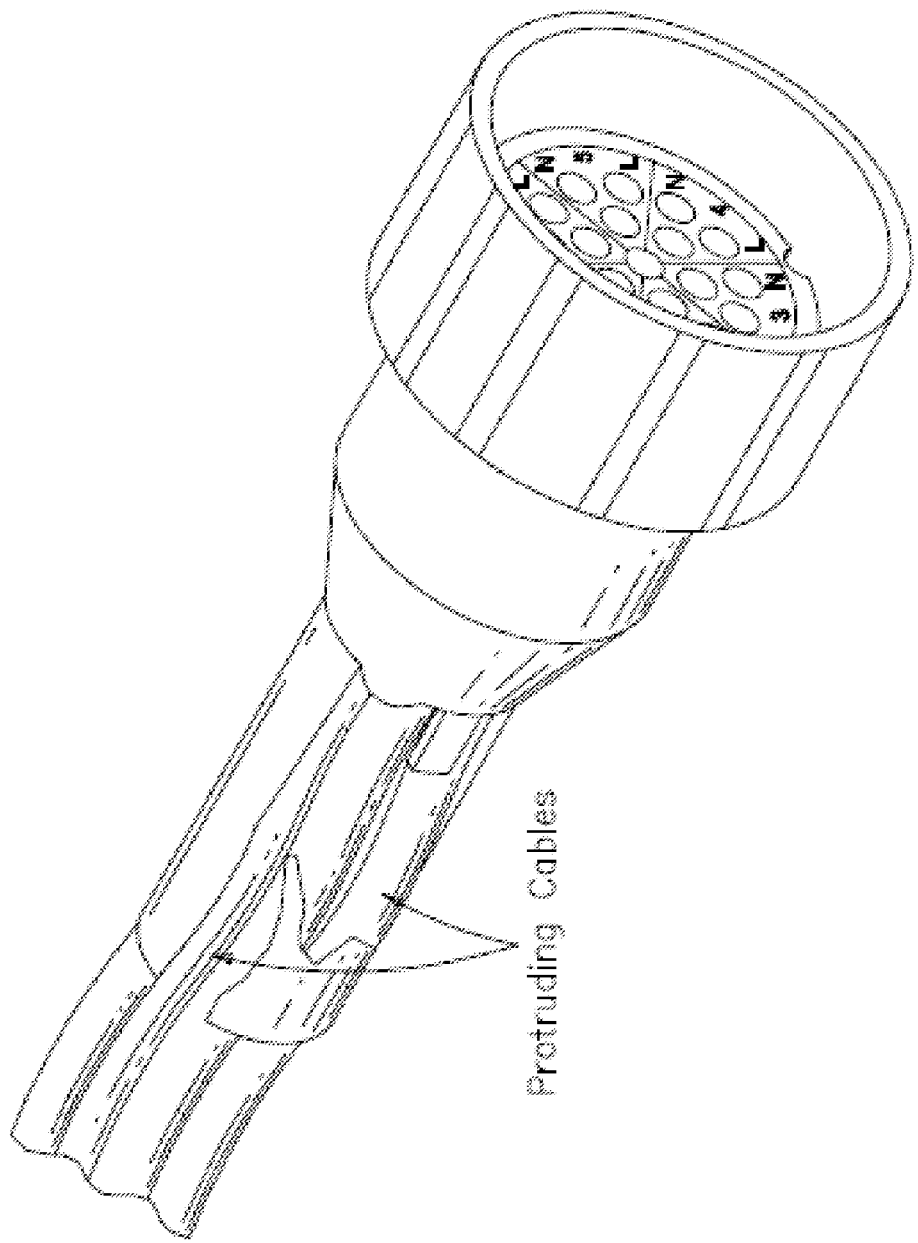
FIG. 8 is perspective view of the prior art electrical connector assembly of following the pre-molding process using the pre-mold mold of FIG. 7.

This is in contrast to an electrical connector that is molded using the prior art mold and methods. Referring to FIG. 7, one of a pair of prior art pre-mold plates 500 is shown along with sectional views along the mold cavity. As can be seen, when both prior art pre-mold plates 500 are connected to form an entire mold, there are 'choke' points throughout the mold where the flow of molten plastic is constantly blocked. This results in a pre-mold that allows the cables to move because the cables are not entirely covered and properly captured by the pre-mold material. This is illustrated by referring to FIG. 8 where it can be seen that parts of the cables 102 are protruding through areas of the prior art electrical connectors pre-mold material. Accordingly, it should be appreciated that the electrical connector molded using the improved mold and method of the present invention provides for a better pre-mold support of the cables 102 than is provided with electrical connectors constructed with molds and methods of the prior art, thus providing for better strain protection.

Figure 9:
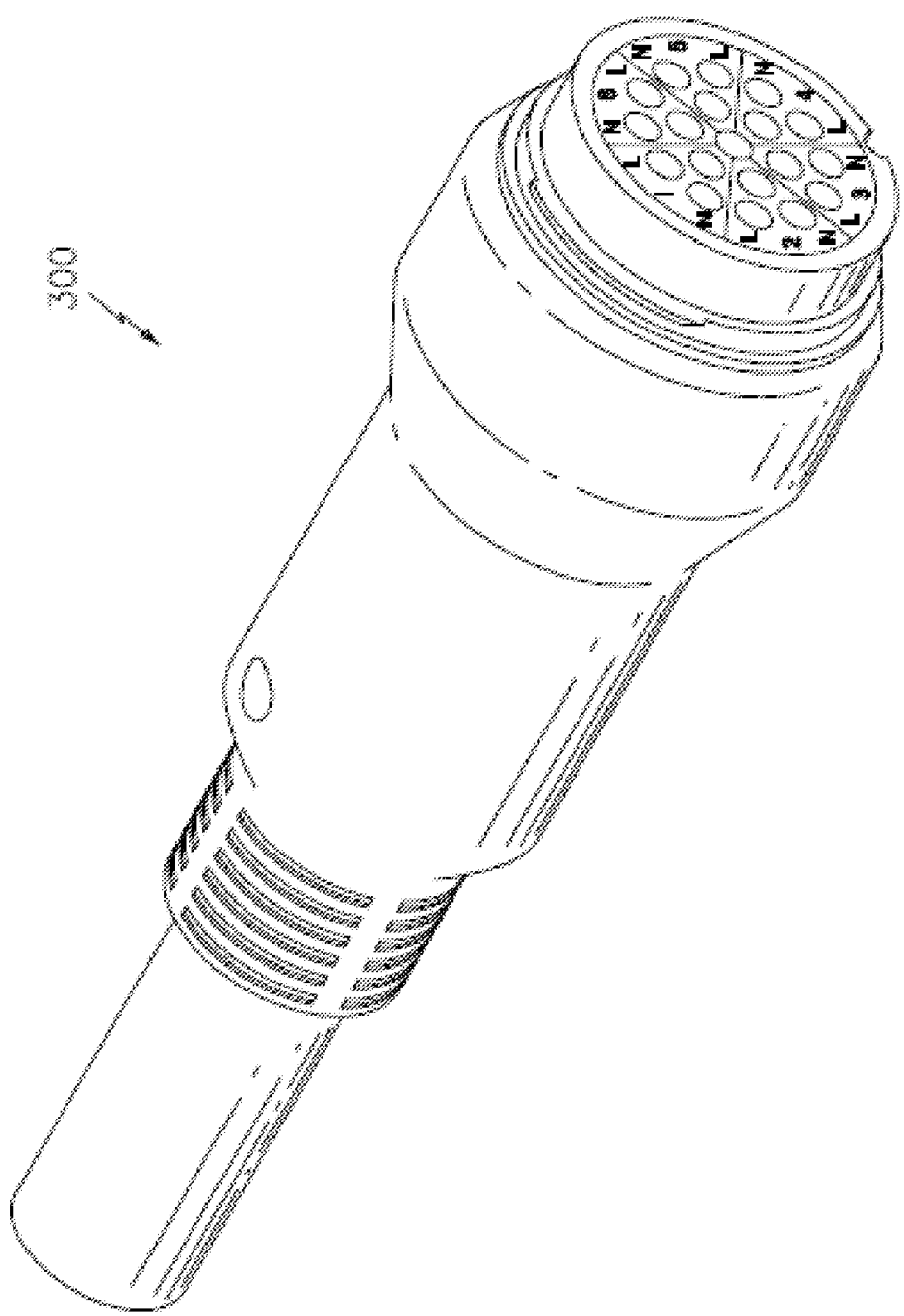
FIG. 9 is an isometric view of an improved molded electrical connector assembly molded with the pre-mold mold of FIG. 2, in accordance with the present invention.
Figure 10:
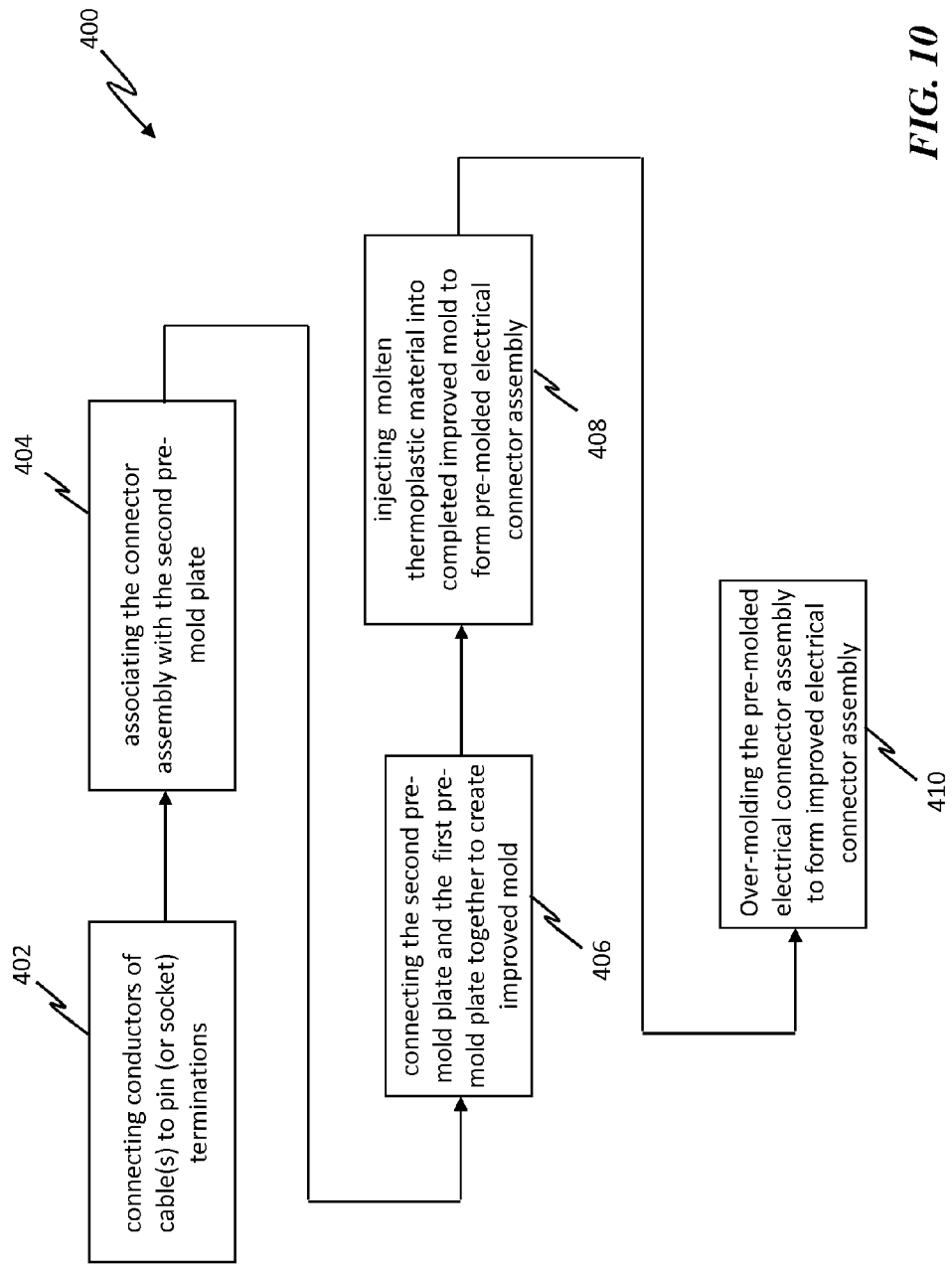
FIG. 10 is an operational block diagram illustrating a method for molding the improved electrical connector assembly of FIG. 5 using the pre-mold mold of FIG. 2.
Figure 11:
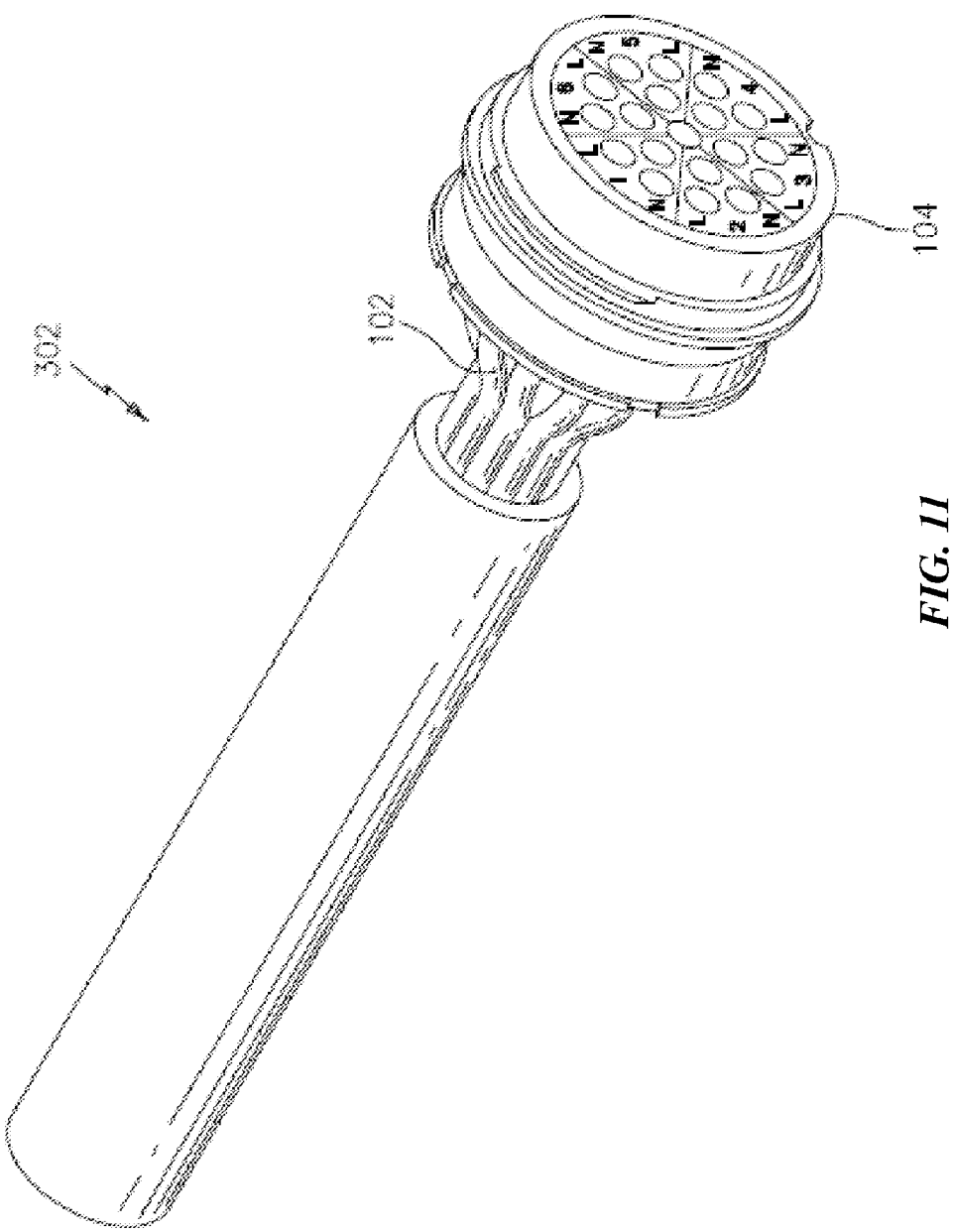
FIG. 11 is an isometric view showing an assembled unmolded electrical connector assembly of FIG. 1a prior to pre-molding using the pre-mold mold of FIG. 2.

Referring to FIG. 9, an improved electrical connector assembly 300 is shown in accordance with the present invention, where the improved electrical connector assembly 300 was molded using the improved pre-mold mold 200 as described herein. The improved electrical connector assembly 300 is described herein in terms of its molding process. Referring to FIG. 10, an operational block diagram 400 illustrating a method for molding the improved electrical connector assembly 300 is shown and includes connecting the conductors of a plurality of cables to the pin (or socket) terminations of an electrical connector to form a connector assembly 302 (See FIG. 11), as shown in operational block 402. The connector assembly 302 includes the cable 102 and the multi-pin (or socket) connector 104. The connector assembly 302 is associated with the second pre-mold plate 204 such that the multi-pin (or socket) connector 104 is positioned within the connector holder portion 234, a portion of the cables 102 are positioned within the cable guides 236 and a portion of the cables 102 are adjacent the control fingers 238 such that the cables 102 are located toward the center of the cavity 228, as shown in operational block 404.

Figure 12:
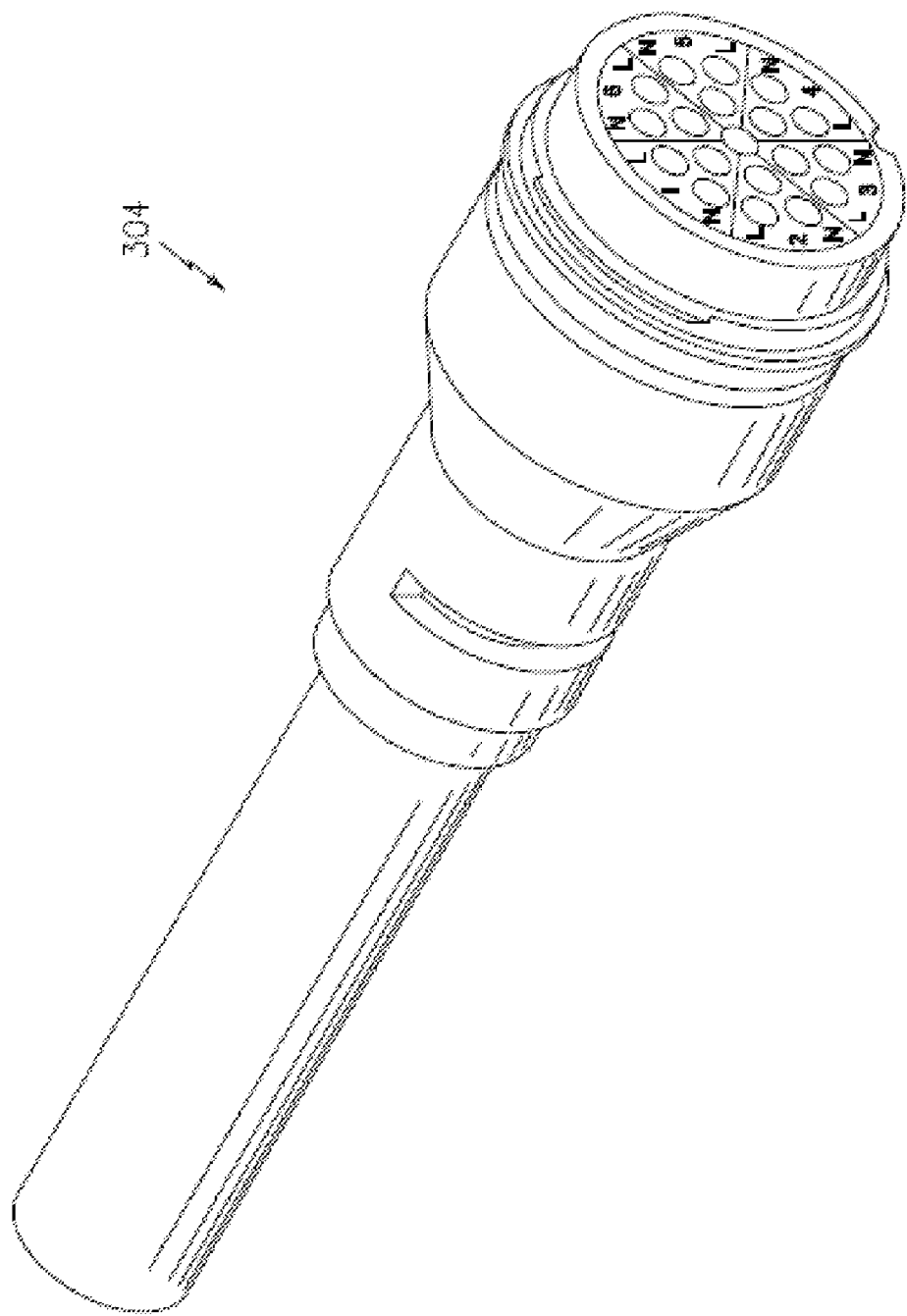
FIG. 12 is an isometric view of the electrical connector assembly of FIG. 11 following the pre-molding process using the pre-mold mold of FIG. 2.

The first pre-mold plate 202 is then securely connected to the second pre-mold plate 204 to form the complete improved pre-mold mold 200 such that the connector holder portion 234 is located within the connector holder cavity 226, a portion of the cables 102 are positioned within the cable guides 212 and a portion of the cables 102 are adjacent the control fingers 214, as shown in operational block 406. When the first pre-mold plate 202 is securely connected to the second pre-mold plate 204 the cables 102 are be configured, as shown in sectionals A-A, B-B and C-C in FIG. 5a and FIG. 5b. This configuration will advantageously allow the molten thermoplastic to flow between and completely around the cables 102 in the area of the control fingers 238, 214 to encapsulate the cables 102 to reduce strain on the conductor-pin connections by providing support and preventing unwanted movement of the cables 102. A pre-molded electrical connector assembly 304 (See FIG. 12) is created by injecting molten thermoplastic material into the molten plastic runner 218, 240 of the improved pre-mold mold 200, as shown in operational block 408. The pre-molded electrical connector assembly 304 may then be applied to an over-mold process which covers the thermoplastic portion of the pre-molded electrical connector assembly 304 with a thermoplastic elastomer (TPE) material, such as a synthetic rubber/polypropylene combination to form the improved electrical connector assembly 300 of FIG. 9, as shown in operational block 410. It should be appreciated that the over-mold material may be constructed from a protective material having an ergonomic property (for easy grip and usage), an electrically insulating property and/or a structurally supporting property. This may be accomplished by associating the pre-molded electrical connector with the over-mold mold and injecting over-mold material in the over-mold mold to cover the pre-molded electrical connector. An electrical connector connection device for mechanically connecting the improved electrical connector to a like connector or a device having a like connector may also be provided, wherein the connection device may be movably secured to the connector housing 106.

It should be appreciated that while the over-mold material provides additional protection and makes the final electrical connector more cosmetically appealing, over-molding of the pre-molded electrical connector assembly is not required. In fact, the pre-molded electrical assembly sufficiently covers, electrically insulates and protects the electrical connector assembly that the pre-molded electrical assembly can be a stand-alone product. In some cases, this may be preferred as this would reduce the time and cost of molding an electrical connector assembly, while still providing a strong, insulated and aesthetically pleasing connector.

It should be appreciated that the first pre-mold plate 202 and the second pre-mold plate 204 may be constructed from any material suitable to the desired end purpose, such as hardened steel, pre-hardened steel, aluminum, beryllium-copper alloy and/or any combination thereof. Moreover, although the pre-mold and over-mold material is discussed herein with regards to being a thermoplastic elastomer (TPE) material, such as Santoprene® or some other synthetic rubber/polypropylene combination, it is contemplated that any material suitable to the desired end purpose may be used, such as a material that has an ergonomic, electrically insulating and/or structurally supporting property. For example, the over-mold may be constructed using a hard plastic material. It should be appreciated that the improved electrical connector of the present invention may be used for various applications across several different types of industries, including, but not limited to, entertainment (video/music), industrial, medical, military and automotive applications (such as a rechargeable vehicle).

In accordance with the present invention, the processing of the method 400 in FIG. 10 may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt (s), communication interface(s), and input/output signal interface(s), as well as combination comprising at least one of the foregoing.

Moreover, the method of the present invention may be embodied in the form of a computer or controller implemented processes. The method of the invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. An electrical connector assembly, comprising:
a plurality of cables, each of which have a conductor;
an electrical connector having a connector housing which houses a plurality of pins/sockets each of which are connected to a pin/socket termination, wherein each pin/socket termination is connected to a conductor of the plurality of cables;
a thermoplastic pre-mold covering which securely covers a portion of the connector housing, the pin/socket terminations and a portion of the plurality of cables, wherein the pre-mold covering includes a control finger cavity and is securely attached to the portion of the connector housing and the pin/socket terminations and to completely surround the portion of the plurality of cables, wherein the pre-mold covering is attached via a pre-mold process which incorporates a mold that includes at least one control finger located within a mold cavity, wherein the at least one control finger is configured to position the plurality of cables away from the wall of the mold cavity during the molding process.

2. The electrical connector assembly of claim 1, further comprising an over-mold material, where the over-mold material covers a portion of the cables and the electrical connector, and the thermoplastic portion of the improved pre-molded electrical connector assembly.

3. The electrical connector assembly of claim 2, wherein the over-mold material is a protective material having at least one of an ergonomic property, an electrically insulating property and a structurally supporting property.

4. The electrical connector assembly of claim 1, further comprising an electrical connector connection device for mechanically connecting the electrical connector to a reciprocal connector or a device having a reciprocal connector, wherein the connection device is movably secured to the connector housing.

5. A electrical connector assembly, comprising:
a connector having a connector housing which houses at least one cable termination which is connected to at least one cable; and
a thermoplastic pre-mold covering which covers a portion of the connector housing, the cable termination and a portion of the at least one cable, wherein the pre-mold covering includes a control finger cavity and is securely attached to the portion of the connector housing and the cable termination and to completely surround the portion the at least one cable, wherein the pre-mold covering is attached via a pre-mold process which incorporates a mold that includes a first pre-mold plate and a second pre-mold plate,
the first pre-mold plate having a first cutout defining a cable portion cavity and a connector-termination portion cavity, wherein the cable portion cavity is configured to contain at least a portion of the at least one cable and the connector-termination portion cavity is configured to contain at least a portion of the cable termination; and
a second pre-mold plate having a second cutout defining a cable portion cavity and a connector-termination portion cavity, wherein the cable portion cavity is configured to contain at least a portion of the at least one cable and the connector-termination portion cavity is configured to contain at least a portion of the cable termination,
wherein the first pre-mold plate and second pre-mold plate are configured to securely connect together to form the mold and wherein each of the first pre-mold plate and second pre-mold plate include at least one control finger located within the cable portion cavity and configured to position the at least one cable away from the wall of the first and second cutout when the first pre-mold plate and second pre-mold plate are connected together.

6. The electrical connector assembly of claim 5, wherein the at least one control finger includes a chamfered portion for minimizing pinching of the at least one cable when the first and second pre-mold plates are connected.

7. The electrical connector assembly of claim 5, wherein the at least one cable includes a plurality of cables and wherein the at least one control finger is configured to position the plurality of cables within the cable portion cavity when the first and second pre-mold plates are connected together such that during molding, thermoplastic is allowed to flow around and between the plurality of cables.

8. The electrical connector assembly of claim 5, wherein each of the first pre-mold plate and the second pre-mold plate include a flow channel which align with each other when the first pre-mold plate and the second pre-mold plate are connected together to allow thermoplastic to flow into the cutout cavity during the molding process such that thermoplastic is distributed on each side of the at least one control finger.

9. The electrical connector assembly of claim 5, wherein each of the first pre-mold plate and the second pre-mold plate include a vent channel which align with each other when the first pre-mold plate and the second pre-mold plate are connected together to allow air to vent from the cutout cavity during the molding process.

10. The electrical connector assembly of claim 5, wherein the first pre-mold plate and the second pre-mold plate are constructed from at least one of hardened steel, pre-hardened steel, aluminum, beryllium-copper alloy and/or any combination thereof.

11. The electrical connector assembly of claim 5, wherein the at least one cable includes at least one electric cable having a conductor and the at least one cable termination includes at least one pin/socket termination.

12. The electrical connector assembly of claim 5, wherein the at least one cable includes at least one fiber optic cable and the at least one cable termination includes at least one fiber optic cable interface.

13. A electrical connector assembly, comprising:
a connector having a connector housing which houses at least one cable termination which is connected to at least one cable; and
a thermoplastic pre-mold covering which covers a portion of the connector housing, the cable termination and a portion of the at least one cable, wherein the pre-mold covering includes a control finger cavity and is securely attached to the portion of the connector housing and the cable termination and to completely surround the portion the at least one cable, wherein the pre-mold covering is attached via a pre-mold process which incorporates a pre-mold mold having a pre-mold cavity and at least one control finger to position cables of the connector assembly during the molding process, wherein the pre-mold process includes,
connecting the at least one cable to the cable termination to form an unmolded connector assembly;
associating the unmolded connector assembly with the pre-mold mold such that the at least one control finger position the at least one cable toward the center of the pre-mold cavity to allow thermoplastic to flow around and between the at least one cable during the molding process; and
introducing thermoplastic into the pre-mold mold to create an improved pre-molded electrical connector assembly, wherein a portion of the at least one cable and the cable termination are covered by thermoplastic.

14. The electrical connector assembly of claim 13, wherein the at least one control finger includes a chamfered portion for minimizing pinching of the at least one cable when the at least one cable is located within the pre-mold cavity.

15. The electrical connector assembly of claim 13, wherein the pre-mold mold includes a first pre-mold plate and a second pre-mold plate which when associated with each other form the pre-mold mold.

16. The electrical connector assembly of claim 15, wherein associating includes securely connecting the first pre-mold plate and the second pre-mold plate together such that the at least one cable is positioned adjacent the at least one control finger.

17. The electrical connector assembly of claim 15, wherein each of the first pre-mold plate and the second pre-mold plate include a vent channel which align with each other when the first pre-mold plate and the second pre-mold plate are connected together to allow air to vent from the cutout cavity during the molding process.

18. The electrical connector assembly of claim 15, wherein the first pre-mold plate and the second pre-mold plate are constructed from at least one of hardened steel, pre-hardened steel, aluminum, beryllium-copper alloy and/or any combination thereof.

19. The electrical connector assembly of claim 13, wherein the at least one cable includes at least one electric cable having a conductor and the at least one cable termination includes at least one pin/socket termination.

20. The electrical connector assembly of claim 13, wherein the at least one cable includes at least one fiber optic cable and the at least one cable termination includes at least one fiber optic cable interface.

* * * * *